Patented Sept. 12, 1950

2,522,407

UNITED STATES PATENT OFFICE 2,522,407

PHYSIOLOGICALLY ACTIVE PYRIDOXINE DERIVATIVES AND METHOD OF PREPARING THE SAME

Esmond E. Snell, Austin, Tex., assignor to Research Corporation, New York, N. Y., a corporation of New York No Drawing. Application May 27, 1944,
Serial No. 537,740

5 Claims. (Cl. 260—296)

This invention relates to physiologically active derivatives of pyridoxine and to a method of preparing the same.

Pyridoxine has the structural formula

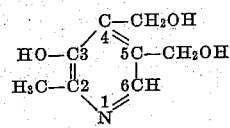

It and its esters exhibit growth promoting properties with respect to certain micro organisms but the growth promoting action is not uniform with respect to different organisms presumably due to the varying ability of different organisms to utilize them.

An object of the present invention is the production of ammonia derivatives of pyridoxine and its esters which are substantially more active as growth promoting agents for certain organisms than is pyridoxine itself.

I have found that growth promoting active derivatives of pyridoxine may be prepared by reacting with ammonia, pyridoxine and its esters as well as the esters of derivatives of pyridoxine having a methyl, hydroxymethyl or etherified hydroxymethyl group in the 4-position and a hydroxymethyl or etherified hydroxymethyl group in the 5-position. For instance, when pyridoxine is heated for 2 hours at 100° C. with alcoholic ammonia the activity of the resulting product is found to be about 22 times that of the untreated pyridoxine. When acetylated pyridoxine is similarly treated with alcoholic ammonia the activity of the product is of the order of from 100 to 400 times as great as that of the untreated, unacetylated pyridoxine with respect to S. lactis.

With respect to the ammonia treatment of the pyridoxine esters the results are substantially the same regardless of the ester used and regardless of whether the phenolic hydroxyl in th 3-position is esterified. Similar results are obtained, for example, with the triacetyl-pyridoxine, tribenzoate of pyridoxine, the triester of pyridoxine with azobenzene-4-carboxylic acid and the 4,5-diacetoxy pyridoxine. The invention is therefore generally applicable to all of the esters of pyridoxine.

Products of increased activity are also obtained by the treatment with ammonia of esters of derivatives of pyridoxine having methyl, hydroxymethyl or etherified hydroxymethyl in the 4-position and hydroxymethyl or etherified hydroxymethyl in the 5-position, such as, for example:

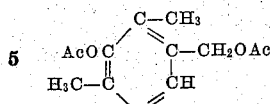 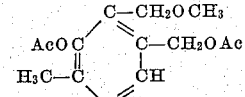

and

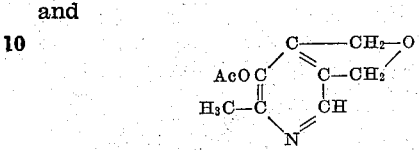

in which Ac represents a carboxylic acid radical.

A suitable procedure for the ammonia treatment of pyroxidine, its esters and the derivatives referred to above is illustrated by the following example:

10 mg. of pyridoxine triacetate is dissolved in 1 cc. of methanol. 1 cc. of a saturated solution of $NH_3$ in methanol (room temperature) is added, and the mixture heated in a sealed tube at 100° C. for 1 hour. The mixture is cooled and the tube opened. The excess ammonia is neutralized, and aliquots of the reaction mixture tested for pyridoxine activity (1) without further treatment and (2) after treatment for 30 minutes with 5 N NaOH. The activity in each case is 200–400 times that of pyridoxine under the same testing conditions.

The heating time given in the foregoing example may be varied within a considerable range. Increased activity results when the heating time is varied from 5 minutes to 2 hours, but maximum activity appears to be attained in about 30 minutes.

The heating temperature given in the example also may be varied. Variation of the temperature from 100° to 120° C. with a heating time within the range from 30 to 45 minutes gave products of about equal activity.

Instead of neutralizing the ammonia as described in the example the reaction mixture may be evaporated to dryness and the product thereby recovered directly in dry form.

The amount of ammonia required in the reaction mixture is not critical. Products of increased activity have been obtained by the use of quantities of ammonia varying from one molecule of ammonia for each molecule of pyridoxine in the reaction mixture to many times this ratio. Some increase in the activity of the product generally is noted as the ratio of ammonia to pyridoxine and its concentration in the reaction mixture are increased. Optimum results are obtained when the ratio and concentration of ammonia to pyridoxine is about that provided when 10 mg. of pyridoxine triacetate are treated with 2 cc. of a 20% solution of ammonia in methanol and 1 cc. of water. Liquid ammonia is somewhat less effective. Amines and bases other than ammonia have been found to be ineffective for increasing the activity of the pyridoxine and its esters but ammonium carbonate, presumably because its dissociates to yield ammonia at elevated temperatures in water, alcohol or other solvents, has been found to be operable.

As stated above, any ester of pyridoxine, such as acetic acid esters, benzoic acid esters and azobenzene-4-carboxylic acid esters, in which at least the two primary hydroxyl groups in the 4 and 5 positions are esterified, may be used. The process works equally well with the diesters and the triesters, i. e. esters in which not only the primary hydroxyl groups but also the phenolic hydroxyl group in 3-position are esterified.

The procedure of the example is capable of wide variation. It is possible, for example, to employ other solvents for the ammonia than methanol, such as ethanol. The methanol or ethanol may be diluted with water up to about 50% without appreciable reduction of the activity of the product obtained. Water alone may be used as the solvent for the ammonia but has been found generally to give products of less activity than those produced when using methanol and ethanol as the solvent. The reaction proceeds successfully in liquid ammonia at 100° C. but the product is no more active than that produced according to the foregoing example. Dioxane, as solvent for the reaction mixture, gives satisfactory results and it appears that any solvent in which the reactants ($NH_3$ and pyridoxine esters) are mutually soluble is operable.

It has been found that the physiologically active product obtained by the treatment of pyridoxine and its esters is an amino compound of the formula

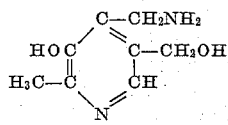

The amino compound may be isolated in the form of its dihydrochloride by treating the amination reaction mixture with picric acid to precipitate the picrate and decomposing the picrate with hydrochloric acid. By treating the dihydrochloride with caustic soda the free amine, having a melting point of 193°–193.5° C., may be obtained.

This compound and the acylation products thereof have growth-promoting activity with respect to many organisms such as *S. lactis R*, at least 100 times that of pyridoxine or the esters thereof and have growth-promoting activity equalling or surpassing that of pyridoxine or its esters for other organisms which require pyridoxine for growth, such as *Lactobacillus casei* and *Saccharomyces cerevisiae*.

I claim:

1. Method for the production of physiologically active derivatives of pyridoxine of the group consisting of 2-methyl-3-hydroxy-4-aminomethyl-5-hydroxymethylpyridine and esters thereof, which comprises reacting with ammonia under pressure at a temperature of at least about 100° C. a compound selected from the group consisting of pyridoxine and esters thereof.

2. Method for the production of 2-methyl-3-hydroxy-4-aminomethyl-5-hydroxymethylpyridine which comprises heating pyridoxine with ammonia under pressure at a temperature of at least about 100° C. and recovering the thus-produced 2-methyl-3-hydroxy-4-aminomethyl-5-hydroxymethylpyridine.

3. Method for the production of esters of 2-methyl-3-hydroxy-4-aminomethyl-5-hydroxymethylpyridine which comprises heating an ester of pyridoxine with ammonia under pressure at a temperature of at least about 100° C.

4. Method as defined in claim 1 in which the reaction is carried out in the presence of a solvent for the reactants.

5. Method as defined in claim 1 in which the pyridoxine compound which is reacted with the ammonia is an ester containing acyl groups in at least the 4 and 5 positions.

ESMOND E. SNELL.

REFERENCES CITED

The following references are of record in the file of this patent:

Zima, Alien Property Custodian; publication Serial No. 346,568, April 20, 1943.

Snell, volume 67, J. A. C. S.; February 1945, page 194.

Kuhn, Office of Publication Board; Report No. 232, Dept. of Commerce, page 11.